United States Patent
Murayama et al.

(10) Patent No.: US 6,905,253 B2
(45) Date of Patent: Jun. 14, 2005

(54) OPTICAL CONNECTOR

(75) Inventors: Shigeki Murayama, Yokkaichi (JP); Kazuhiro Asada, Nagoya (JP)

(73) Assignees: Autonetworks Technologies, Ltd., Mie (JP); Sumitomo Wiring Systems, Ltd., Mie (JP); Sumitomo Electric Industries, Ltd., Osaka (JP)

(*) Notice: Subject to any disclaimer, the term of this patent is extended or adjusted under 35 U.S.C. 154(b) by 158 days.

(21) Appl. No.: 10/143,457

(22) Filed: May 14, 2002

(65) Prior Publication Data

US 2002/0168151 A1 Nov. 14, 2002

(30) Foreign Application Priority Data

May 14, 2001 (JP) .................................... 2001-142893

(51) Int. Cl.⁷ .............................................. G02B 6/36
(52) U.S. Cl. ........................................ 385/86; 385/87
(58) Field of Search ........................ 350/96.2–96.23; 385/60, 71, 72, 75, 76, 78, 79, 80, 86, 87, 89, 90, 26

(56) References Cited

U.S. PATENT DOCUMENTS

| | | | | |
|---|---|---|---|---|
| 4,233,724 A | * | 11/1980 | Bowen et al. ................ 29/428 |
| 4,715,675 A | * | 12/1987 | Kevern et al. ............... 385/80 |
| 4,759,599 A | * | 7/1988 | Yamaguchi et al. .......... 385/60 |
| 5,073,044 A | * | 12/1991 | Egner et al. .................. 385/86 |
| 5,138,678 A | * | 8/1992 | Briggs et al. ................. 385/86 |
| 5,233,677 A | * | 8/1993 | Winslow ...................... 385/89 |
| 5,347,603 A | * | 9/1994 | Belenkiy et al. ............. 385/86 |
| 5,354,212 A | | 10/1994 | Bartle et al. |
| 5,461,690 A | * | 10/1995 | Lampert ..................... 385/100 |
| 5,530,787 A | * | 6/1996 | Arnett ........................ 385/137 |
| 5,570,443 A | * | 10/1996 | May et al. ................... 385/75 |
| 5,710,851 A | * | 1/1998 | Walter et al. ................ 385/86 |
| 5,867,621 A | * | 2/1999 | Luther et al. ................ 385/59 |
| 5,915,056 A | * | 6/1999 | Bradley et al. .............. 385/76 |
| 6,007,256 A | | 12/1999 | Asada et al. |
| 6,151,432 A | * | 11/2000 | Nakajima et al. ........... 385/60 |
| 6,390,687 B1 | * | 5/2002 | Shirakawa ................... 385/86 |
| 6,601,997 B2 | * | 8/2003 | Ngo ............................ 385/86 |
| 2001/0043775 A1 | * | 11/2001 | Shirakawa et al. .......... 385/59 |

FOREIGN PATENT DOCUMENTS

| | | |
|---|---|---|
| EP | 0 629 887 A1 | 12/1994 |
| EP | 1 251 379 A2 | 10/2002 |
| JP | A 10-78532 | 3/1998 |
| JP | A 10-78534 | 3/1998 |

* cited by examiner

Primary Examiner—John R. Lee
Assistant Examiner—David A. Vanore
(74) Attorney, Agent, or Firm—Oliff & Berridge, PLC

(57) ABSTRACT

The outer periphery of the code leading end portion of the rear end portion of a connector housing is formed in a regular quadrilateral shape, while the inner periphery of the mounting end portion of a code hold boot member is formed in a regular quadrilateral shape which allows the mounting end portion inner periphery to be fitted with the outer surfaces of the code draw-out end portion. A plurality of projection-shaped engaging portions are formed in the respective composing surfaces of the outer periphery of the code leading end portion and, a plurality of engaging portions are formed in the respective composing surfaces of the inner periphery of the mounting end portion. The mounting end portion of the code hold boot member can be fitted with the outer surfaces of the code leading end portion in four different postures leading in upper, lower, right and left directions.

4 Claims, 4 Drawing Sheets

OPTICAL CONNECTOR

BACKGROUND OF THE INVENTION

1. Field of the Invention

This invention relates to an optical connector for use in the field of optical communication including equipment carried on board a car, OA (office automation) equipment and public welfare equipment.

2. Background Art

When drawing out an optical fiber code from the rear portion of an optical connector, in case where there exists any obstacle in the rear of the optical connector, to keep away from the obstacle, the optical fiber code must be bent and lead to the lateral side of the optical connector. In this operation, in case where the optical fiber code is bent suddenly, the bent portion of the optical fiber code causes a large light loss and, therefore, it is necessary to prevent excessive degrees of bending of the optical fiber code.

In conventional optical connectors, generally, a boot member made of rubber or plastic material having a given degree of elasticity is placed on the leading portion of the optical fiber code to lead from the optical connector, thereby preventing excessive degrees of bending of the present leading portion.

In this case, the boot member can be elastically deformed to such a degree that the optical fiber code is not allowed to bend excessively and, therefore, the leading direction of the optical fiber code from the optical connector can be adjusted easily.

However, on the other hand, since the leading direction of the optical fiber code is not fixed, for example, in case where an optical connector is connected to its mating optical connector in a narrow pace, the leading direction of the optical fiber code must be corrected and adjusted properly so that the optical fiber code leading from the rear of the optical connector can be prevented from interfering with other parts, which results in the poor connecting operation efficiency.

In view of this, there can be expected a structure in which the boot member is made of high-hardness material such as ABS resin to thereby fix the leading direction of the optical fiber code. However, in this structure, because the leading direction of the optical fiber code is fixed, the leading direction of the optical fiber code cannot be adjusted according to the installation place of the optical connector, which is practically inconvenient.

In an optical connector disclosed in Japanese patent Application, first publication No.Hei10-78534 (JP-A-10-78534), a protection member corresponding to the above-mentioned boot member is rotatably mounted on the rear portion of the connector housing of the optical connector, which makes it possible to adjust the leading direction of the optical fiber code.

However, in the optical connector disclosed in JP-A-10-78534, since the leading direction of the optical fiber code can be changed in a state where the protection member has been mounted on the connector housing, there is a possibility that the leading direction of the optical fiber code can be changed due to some external impact or pressure and thus the optical fiber code can lead in an unexpected direction. In this case, when trying to assemble other members at the installation place of the optical connector, there can arise problems that the optical fiber code leading in the unexpected direction can provide an obstacle to the assembling operation and/or the present optical fiber code can be sandwiched between the members.

SUMMARY OF THE INVENTION

In view of the above, it is an object of the invention to provide an optical connector which is capable of adjusting the leading direction of an optical fiber code and, after assembled, can keep the leading direction of an optical fiber code in a fixed direction.

In attaining the above object, according to a first aspect of the invention, there is provided an optical connector, comprising: a connector housing structured such that an optical fiber code can be inserted into and held by the connector housing and the optical fiber code can lead to the outside from the code leading end portion of the connector housing; and, a code hold boot member for holding the optical fiber code leading to the outside from the code leading end portion side of the connector housing in a given posture in which the optical fiber code is bent at a given bending angle, wherein the code hold boot member can be mounted onto and fixed to the code leading end portion of the connector housing in two or more postures in which the optical fiber code to lead from the code leading end portion can lead in mutually different directions.

By the way, as in a second aspect of the invention, in an optical connector as set forth in the first aspect of the invention, in the case of an optical connector in which the mounting end portion of the code hold boot member is fitted with the outer surfaces of the code leading end portion, preferably, there may be employed the following structure: that is, not only the outer periphery of the code leading end portion is formed not circular but is formed to have rotational symmetry so as to be rotatable at a given angle about the axis of the optical fiber code to lead from the code leading end portion, but also the inner periphery of the mounting end portion of the code hold boot member is also formed to have such rotational symmetry as corresponds to the shape of the outer periphery of the code leading end portion.

Also, as in a third aspect of the invention, in an optical connector as set forth in the second aspect of the invention, preferably, in the periphery of the outer periphery of the code leading end portion of the connector housing, there may be formed a plurality of engaging portions at regular intervals of the above given angle and, in the periphery of the inner periphery of the mounting end portion of the code hold boot member, there maybe formed a plurality of engaging portions at regular intervals of the above-mentioned given angle which can be engaged with the engaging portions of the connector housing.

DETAILED DESCRIPTION OF THE PREFERRED EMBODIMENTS

Now, description will be given below of an embodiment of an optical connector according to the invention.

Figure 1:
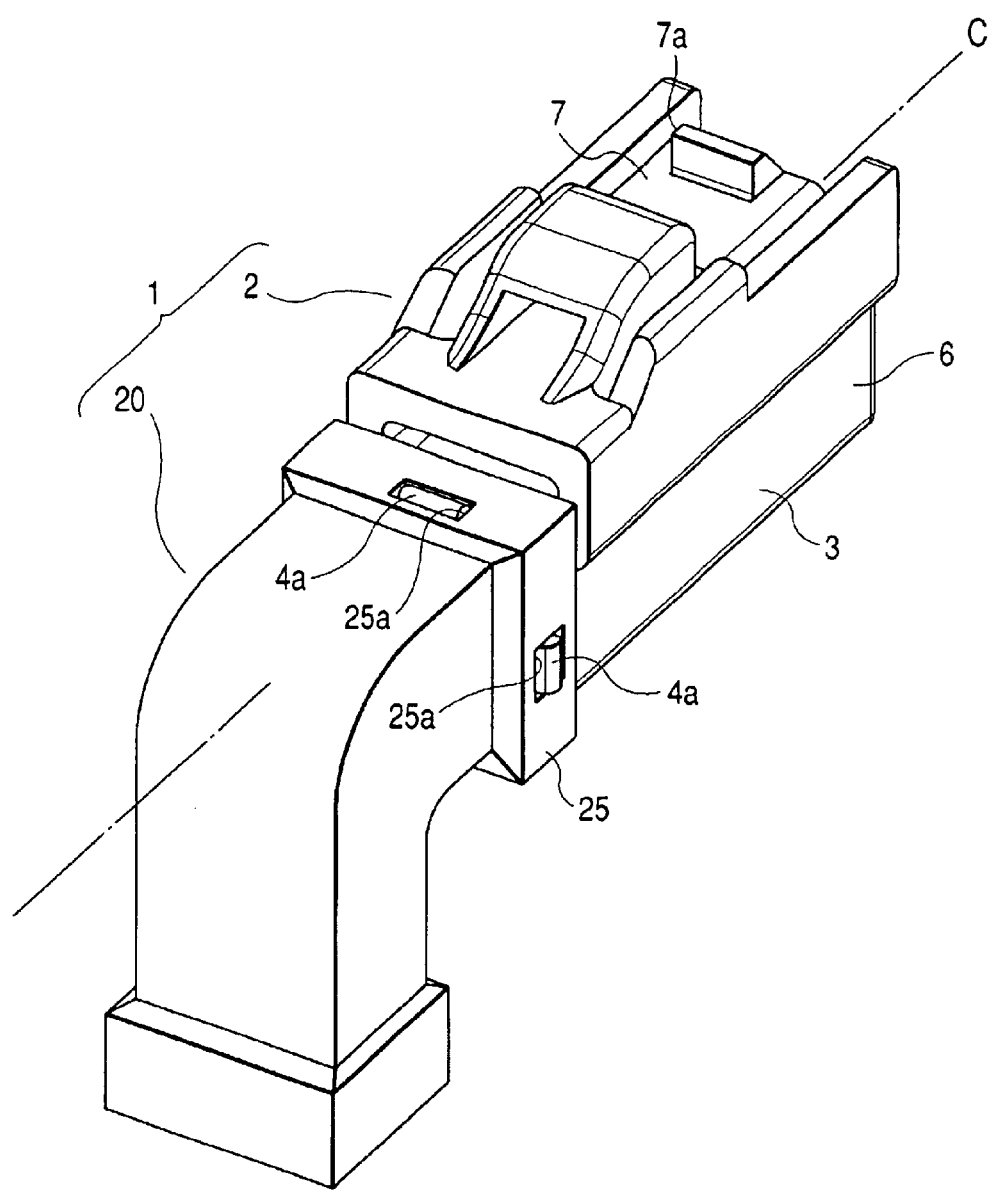
FIG. 1 is a perspective view of an embodiment of an optical connector according to the invention.
Figure 2:
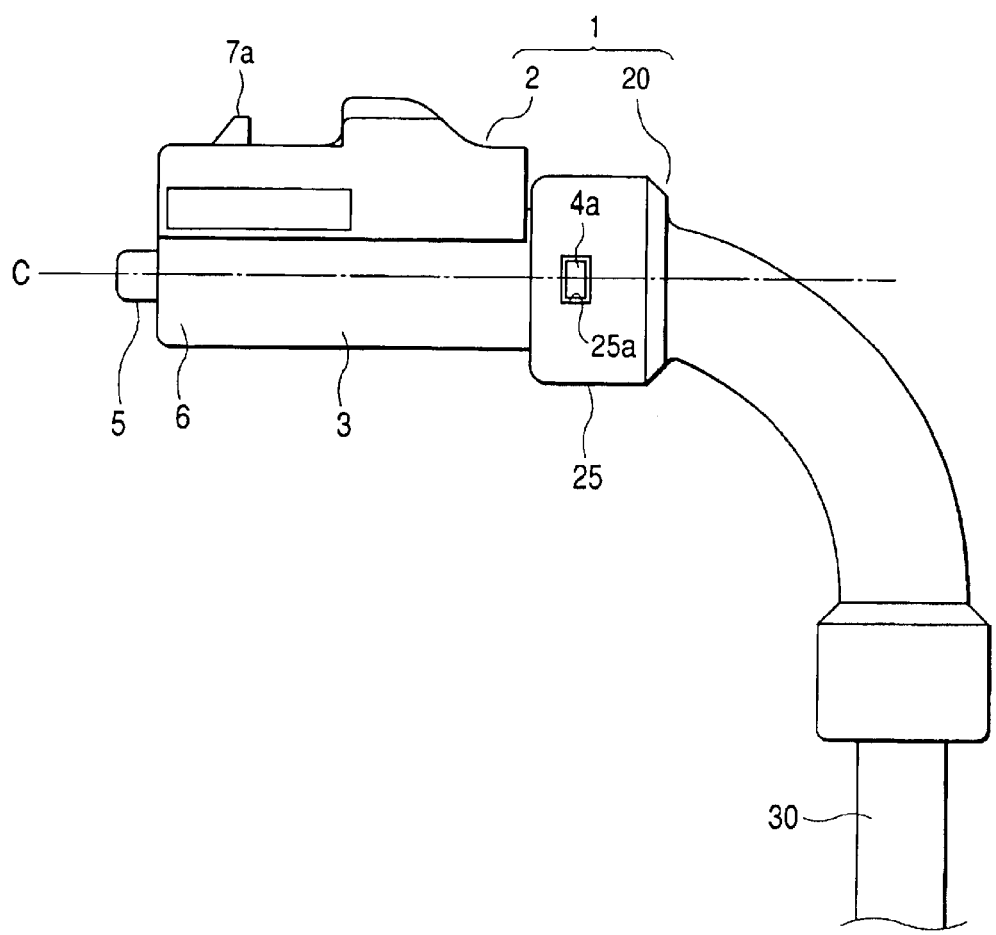
FIG. 2 is a side view of the above optical connector.
Figure 3:
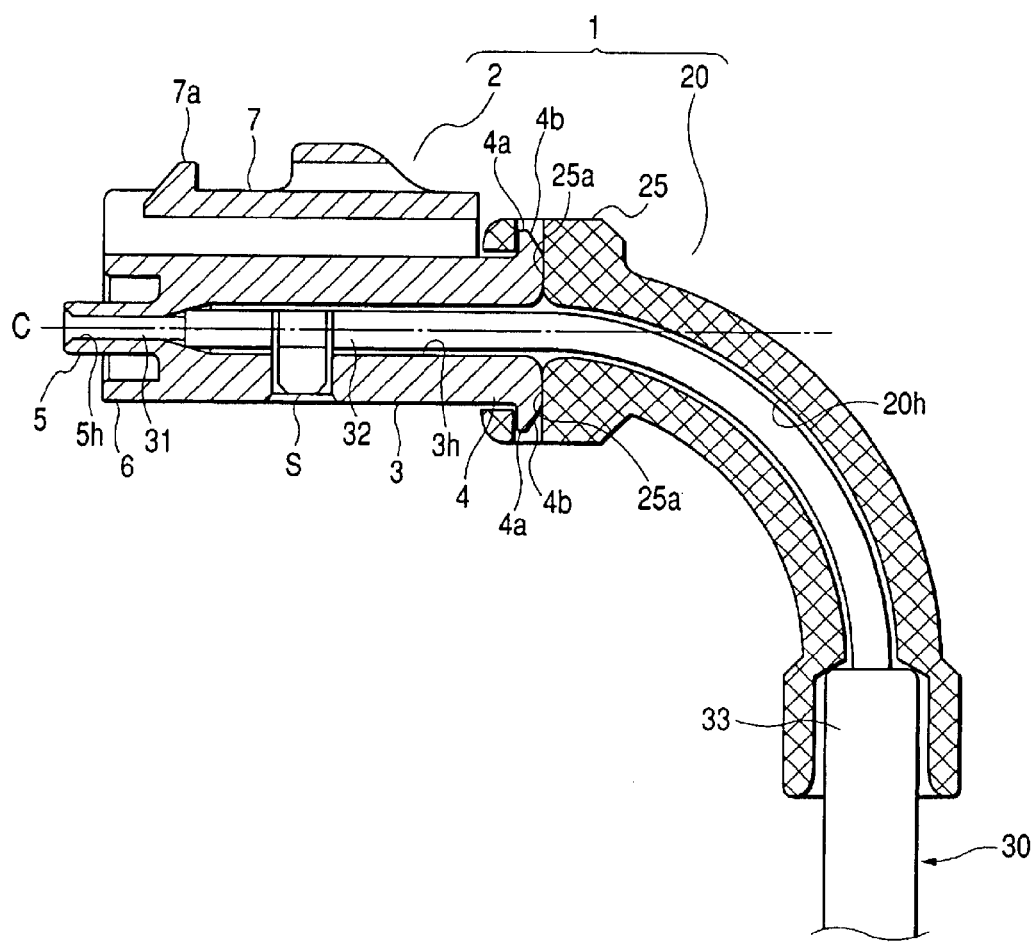
FIG. 3 is a section view of the above optical connector.
Figure 4:
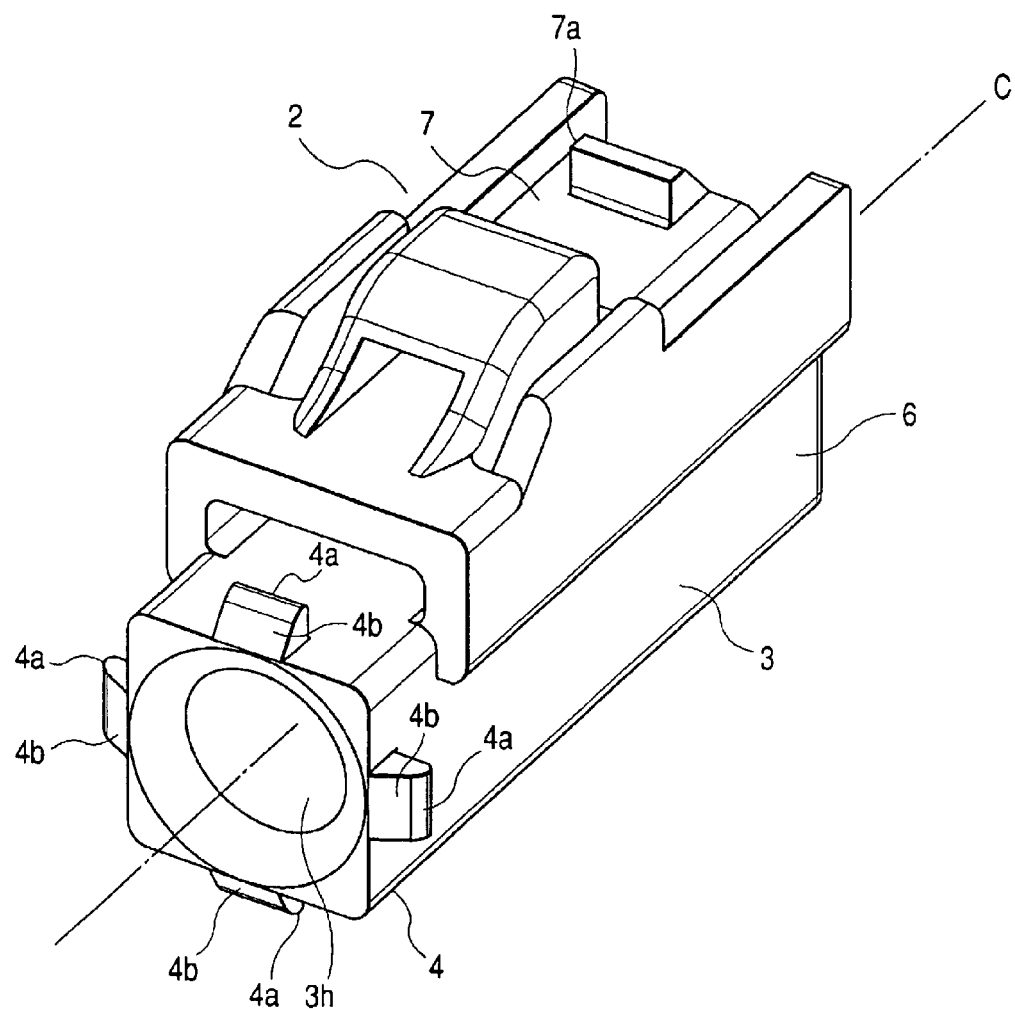
FIG. 4 is a perspective view of a connector housing used in the above optical connector.

The present optical connector 1, as shown in FIGS. 1 to 3, comprises a connector housing 2 and a code hold boot member 20.

The connector housing 2, as shown in FIGS. 1 to 4, is structured such that not only an optical fiber code 30 can be inserted into and held by the connector housing 2 but also the optical fiber code 30 can lead to the outside from the code leading end portion 4 side of the connector housing 2.

Here, the optical fiber code 30 includes an optical fiber 31, which is composed of a core and a clad, a first cover portion 32 and a second cover portion 33, while the optical fiber 31 is covered with both of the first and second cover portions 32 and 33. In a state where the optical fiber code 30 is held by the optical connector 1, in the end portion of the optical fiber code 30, the second cover portion 33 is removed by a given length and also, in the same end portion of the optical fiber code 30, the first cover portion 32 is also removed by a given length, whereby the optical fiber 31 is exposed in the present end portion.

Describing the connector housing 2 specifically, the connector housing 2 is formed of resin and includes a prism-shaped housing main body 3 and a tube-shaped ferrule portion 5 provided on and projected from the leading end portion of the housing main body 3.

In the interior of the housing main body 3, there is formed a code storage hole 3h which extends in the axial direction of the housing main body 3 and also into which the cover portion (here, the first cover portion 32) of the optical fiber code 30 can be inserted. And, in the interior of the ferrule portion 5, there is formed a fiber hold hole 5h which is situated on the extension of the code storage hole 3h and also into which the optical fiber 31 can be inserted.

In case where the optical fiber code 30 is inserted into the code storage hole 3h and fiber hold hole 5h from the rear portion of the housing main body 3, the optical fiber 31 with its end portion exposed is inserted into and held by the fiber hold hole 5h and, at the same time, the first cover portion 32 portion of the optical fiber code 30, which exists upstream of the optical fiber 31, is inserted into and held by the code storage hole 3h. In this state, the optical fiber code 30 is positioned and held along the axial direction thereof by positioning means using a stopper or an adhesive. In the present embodiment, there is assumed a structure in which a stopper S is inserted into the code storage hole 3h from the bottom surface side of the housing main body 3 and is engaged with the first cover portion 32, whereby the optical fiber code 30 is positioned and held along the axial direction thereof (see FIG. 3). By the way, the end face of the optical fiber 31 is mirror finished by the end portion of the ferrule portion 5.

Also, the optical fiber code 30 leads to the outside through the rear opening of the code storage hole 3h. That is, the rear portion of the connector housing 2 is the code leading end portion 4 thereof and thus the optical fiber code 30 leads to the outside from the code leading end portion 4 side of the connector housing 2.

By the way, the ferrule portion 5 is enclosed by a substantially tube-shaped hood portion 6 which is provided on and projected from the leading end portion of the housing main body 3. Also, on the top portion of the housing main body 3, there is disposed an extension piece 7 which extends forwardly from the rear end portion of the present top portion; and, on the top portion of the leading end portion of the extension piece 7, there is formed an engaging projection 7a. In a state where the present optical connector 1 is connected to its mating connector, the engaging projection 7a is engaged with a portion to be engaged formed in the mating connector to thereby hold the connected state of the two connectors.

The code hold boot member 20 is structured such that, as shown in FIGS. 1 to 3, it is able to hold the optical fiber code 30 leading to the outside from the code leading end portion 4 side of the connector housing 2 in such a posture that it is bent at a given bending angle.

Specifically, the code hold boot member 20 is formed of the material that can hold the optical fiber code 30 in a given bent posture, for example, high-hardness material such as ABS resin; and, the code hold boot member 20 has a shape which can be obtained by bending a substantially prismatic-shaped material at a given angle (here, an angle of about 90°). By the way, preferably, the bent shape may be a shape which does not cause an excessively large light loss in the optical fiber 31, for example, a shape having a radius of curvature equal to or more than the minimum bending radius that can be given in the specifications of the optical fiber 31.

In the interior of the code hold boot member 20, there is formed a code hold hole 20h into and by which the optical fiber code 30 can be inserted and held along the axial direction thereof.

In a state where the code hold boot member 20 is mounted on the connector housing 2, the opening of the code hold hole 20h on the other end side of the code hold boot member 20 is formed at a position disposed opposed to the rear opening of the code storage hole 3h formed on the connector housing 2 side; and, the optical fiber code 30 leading from the rear opening of the code storage hole 3h is directly inserted into the code hold hole 20h.

Also, the intermediate portion of the code hold hole 20h, which extends from one end side of the code hold boot member 20 to the other end side thereof, is formed in such a diameter dimension as allows the first cover portion 32 to be inserted into the present intermediate portion; and, the portion of the code hold hole 20h extending from the above intermediate portion to the other end side thereof is formed in such a diameter dimension as allows the second cover portion 3 to be inserted into the present portion. And, in case where the optical fiber code 30 is inserted into the code hold hole 20h from the other end side of the code hold boot member 20 and the end portion of the optical fiber code 30 is projected from one end side of the code hold boot member 20 by the length of the optical fiber code 30 to be held by the connector housing 2, not only the first cover portion 32 of the optical fiber code 30 is inserted into and held by the one-end side portion of the code hold hole 20h but also the second cover portion 33, which exists upstream of the first cover portion 32, is inserted into and held by the other-end side portion of the code hold hole 20h. Thanks to this, the optical code 30 can be held in the bent posture in which it is bent at a given bending angle.

Also, the code hold boot member 20 can be mounted onto the code leading end portion 4 of the connector housing 2 in two or more postures in which the optical fiber code 3 to lead from the code leading end portion 4 can lead in the mutually different directions.

As a structure in which the code hold boot member 20 can be mounted onto the code leading end portion 4 of the connector housing 2 in such two or more postures as described above, there can be employed a structure in which, the mounting end portion 25 of the code hold boot member 20 on the one-end side thereof is fitted with the outer surface of the code leading end portion 4, the outer periphery of the code leading end portion 4 is formed not circular but is formed to have rotational symmetry so as to be rotatable at a given angle about the axis C of the optical fiber code 30 (for example, a regular polygonal shape) and, at the same time, the shape of the inner periphery of the mounting end portion 25 of the code hold boot member 20 (the inner peripheral shape of the code hold hole 20h on the one-end side thereof) is formed as a shape which corresponds to the above-mentioned shape of the outer periphery of the code leading end portion 4.

According to the present embodiment, the above-mentioned given angle is set at an angle of substantially 90°, that is, not only the outer periphery of the code leading end portion 4 is formed in a regular quadrilateral shape (see FIG. 4) but also the inner periphery of the mounting end portion 25 of the code hold boot member 20 is formed in a regular quadrilateral shape which corresponds to the shape of the outer periphery of the code leading end portion 4 (see FIG. 1).

Thanks to this, the mounting end portion 25 of the code hold boot member 20 can be fitted with the outer surfaces of the code leading end portion 4 in any one of the following four postures in which the mounting end portion 25 of the code hold boot member 20 can be rotated about the axis of the optical fiber code 30 every 90°; specifically, a posture in which the other end portion of the code hold boot member 20 faces downward (see FIGS. 1 to 3); a posture in which it faces in the opposite direction, that is, it faces upward; a posture in which it faces in the right direction; and, a posture in which it faces in the left direction.

Further, in the periphery of the outer peripheral portion of the code leading end portion 4 of the connector housing 2, a plurality of engaging portions 4a are formed around the axis C of the optical fiber code 30 at regular intervals of a given angle; and, at the same time, in the periphery of the inner peripheral portion of the mounting end portion 25 of the code hold boot member 20, a plurality of engaging portions 25a, which can be respectively engaged with their associated engaging portions 4a, are formed around the axis C of the optical fiber code 30 at the above-mentioned at regular intervals of the above-mentioned given angle.

In the present embodiment, since the above-mentioned given angle is set at an angle of 90°, that is, since the outer periphery of the code leading end portion 4 is formed in a regular quadrilateral shape and the inner periphery of the mounting end portion 25 is formed in a regular quadrilateral shape which corresponds to the shape of the outer periphery of the code leading end portion 4, in the respective composing surfaces of the outer periphery of the code leading end portion 4, there are formed projection-shaped engaging portions 4a and, in the respective composing surfaces of the inner periphery of the mounting end portion 25, there are formed engaging portions 25a which can be engaged with the engaging portions 4a. By the way, the rear end portions of the respective engaging portions 4a are formed as guide surfaces 4b which are inclined inwardly in the backward direction.

Thanks to this, even in case where the mounting end portion 25 of the code hole boot member 20 is fitted with the outer surfaces of the code leading end portion 4 in any one of the above-mentioned four postures, all of the engaging portions 4a can be engaged with their associated engaging portions 25a.

Now, description will be given below of the procedure for assembling the optical connector 1. Firstly, the second cover portion 33 in the end portion of the optical fiber code 30 is removed from the present end portion by a given length and, at the same time, the first cover portion 33 in the present end portion is removed therefrom by a given length, thereby exposing the optical fiber 31.

The thus exposed end portion of the optical fiber code 30 is inserted into the code hold hole 20h from the other end side of the code hold boot member 20 to thereby project the end portion of the optical fiber code 30 by the length that is to be held by the connector housing 2.

Next, while directing the other end portion of the code hold boot member 20 in the desired right or left direction or in the desired upward or downward direction (the desired direction can be decided properly according to limits on the space that is available in the periphery of the installation place of the optical connector 1), the end portion of the optical fiber code 30 projecting on the one-end side of the code hold boot member 20 is inserted into the code storage hole 3h and fiber hold hole 5h from behind the housing main body 3, so that the end portion of the optical fiber code 30 can be held by the connector housing 2. At the same time, the mounting end portion 25 of the code hold boot member 20 is fitted with the outer surfaces of the code leading end portion 4 to thereby bring the guide surfaces 4b of the respective engaging portions 4a into contact with the open edges of the mounting end portion 25; and, in this state, in case where the mounting end portion 25 is strongly pressed toward the code leading end portion 4, the mounting end portion 25 is flexed and deformed slightly in the outward direction and the code leading end portion 4 is flexed and deformed slightly in the outward direction, so that the respective engaging portions 4a are moved beyond the rear end edges of the mounting end portion 25 and are then respectively engaged with their associated engaging portions 25a. Due to this, in a state where the code hold boot member 20 is held in the desired posture with respect to the connector housing, the mounting end portion 25 can be fitted with and fixed to the outer surfaces of the code leading end portion 4.

According to the above-structured optical connector 1, since the code hold boot member 20 can be mounted onto and fixed to the code leading end portion 4 of the connector housing 2 in two or more postures in which the optical fiber code 30 to lead from the code leading end portion 4 can lead in the mutually different directions (in the case of the illustrated embodiment, the optical fiber code 30 can lead in four postures in which it can lead in the four directions, that is, the upper, lower, right and left directions), by changing the mounting posture of the code hold boot member 20 according to the limits on the space in the periphery of the installation place of the optical connector 1, the leading direction of the optical fiber code 30 can be adjusted.

Also, after completion of the assembly of the optical connector 1, since the code hold boot member 20 is fixed to the code leading end portion 4 of the connector housing 2, the leading direction of the optical fiber code 30 can be kept constant. Thanks to this, when connecting the optical connector 1 to its mating optical connector, the present connecting operation can be carried out without adjusting the leading direction of the optical fiber code 30, that is, the present connecting operation can be executed easily. Further, after completion of the connecting operation of the optical connector 1, because the optical fiber code 30 is held in a state in which it has led in the desired direction, there can be prevented a fear that the optical fiber code 30 can impede an operation to assemble other parts or the optical fiber code 30 can be caught between the parts.

Further, not only because, in the code leading end portion 4 of the connector housing 2, the plurality of engaging portions 4a are formed at regular intervals of a given angle around the axis C of the optical fiber code 30 (in the case of the illustrated embodiment, the projection-shaped engaging portions 4a are formed in the respective composing surfaces of the outer periphery of the code leading end portion 4), but also because, in the mounting end portion 25 of the code hold boot member 20, the plurality of engaging portions 25*a* to be engageable with their associated engaging portions 4*a* are formed at regular intervals of the above-mentioned given angles around the axis C of the optical fiber code 30 (in the case of the illustrated embodiment, the hole-shaped engaging portions 25*a* are formed in the respective composing surfaces of the inner periphery of the mounting end portion 25), in any one of the mounting postures of the code hold boot member 20, the respective engaging portions 4*a* can be engaged with their associated engaging portions 25*a*, so that the code hold boot member 20 can be mounted onto and fixed to the code leading end portion 4 of the connector housing 2.

As has been described heretofore, according to the invention, since the code hold boot member can be mounted onto and fixed to the code leading end portion of the connector housing in two or more postures in which the optical fiber code to lead from the present code leading end portion can lead in the mutually different directions, by changing the mounting posture of the code hold boot member, the leading direction of the optical fiber code can be adjusted. Also, after completion of the assembly of the present optical connector, since the code hold boot member is fixed to the code leading end portion of the connector housing, the leading direction of the optical fiber code can be kept constant.

Also, according to an optical connector of the invention, not only because, in the outer peripheral portion of the code leading end portion of the connector housing, the plurality of engaging portions are formed at regular intervals of the above-mentioned given angle, but also because, in the inner peripheral portion of the mounting end portion of the code hold boot member, the plurality of engaging portions to be engageable with the engaging portions of the connector housing are formed at regular intervals of the above-mentioned given angle, in any one of the mounting postures of the code hold boot member, the respective engaging portions of the connector housing can be engaged with their associated engaging portions of the code hold boot member.

What is claimed is:

1. An optical connector comprising:
   a connector housing for holding an optical fiber code, the optical fiber code leading to outside from the connector housing; and
   a code hold boot member for holding the optical fiber code which is bent at a given bending angle,
   wherein
   the connector housing has a code leading end portion from which the optical fiber code leads to the outside;
   the code hold boot member can be mounted onto outer surfaces of the code leading end portion in at least two postures so that the optical fiber code leads in mutually different directions;
   the code hold boot member has a mounting end portion to be mounted on and fitted with the code leading end portion; and
   the mounting end portion is adjusted on the code leading end portion about an axis of the optical fiber code such that the code hold boot member can only be mounted at equally spaced intervals about the axis.

2. The optical connector according to claim 1 wherein
   the code leading end portion has a plurality of first engaging portions formed at the equally spaced intervals; and
   the mounting end portion has a plurality of second engaging portions capable of being engaged with the first engaging portions.

3. The optical connector according to claim 1 wherein
   a cross-section of the code leading end portion of the connector housing is a polygonal shape.

4. The optical connector according to claim 1 wherein
   a cross-section of the code leading end portion of the connector housing is a shape that includes at least four corners.

* * * * *